US010364188B2

(12) United States Patent
Davoli et al.

(10) Patent No.: US 10,364,188 B2
(45) Date of Patent: Jul. 30, 2019

(54) COMPOSITION FOR REFRACTORY MATERIAL

(71) Applicant: BOTTEGA DEL FUOCO DI DAVOLI E C. SNC, Bibbiano (IT)

(72) Inventors: Davide Davoli, Quattro Castella (IT); Simone Davoli, Bibbiano (IT)

(73) Assignee: BOTTEGA DEL FUOCO DI DAVOLI E C. SNC, Bibbiano (RE) (IT)

( * ) Notice: Subject to any disclaimer, the term of this patent is extended or adjusted under 35 U.S.C. 154(b) by 0 days.

(21) Appl. No.: 15/764,078

(22) PCT Filed: Sep. 22, 2016

(86) PCT No.: PCT/IB2016/055653
§ 371 (c)(1),
(2) Date: Mar. 28, 2018

(87) PCT Pub. No.: WO2017/060789
PCT Pub. Date: Apr. 13, 2017

(65) Prior Publication Data
US 2018/0282221 A1    Oct. 4, 2018

(30) Foreign Application Priority Data
Oct. 9, 2015  (IT) ......................... 102015000060189

(51) Int. Cl.
*C04B 33/04*  (2006.01)
*C04B 33/28*  (2006.01)
(Continued)

(52) U.S. Cl.
CPC .............. *C04B 33/04* (2013.01); *C04B 33/13* (2013.01); *C04B 33/1305* (2013.01); *C04B 33/24* (2013.01); *C04B 33/28* (2013.01); *C04B 33/30* (2013.01); *C04B 33/32* (2013.01); *C04B 35/66* (2013.01); *C04B 2235/3201* (2013.01); *C04B 2235/3203* (2013.01); *C04B 2235/3206* (2013.01); *C04B 2235/3208* (2013.01); *C04B 2235/3232* (2013.01);
(Continued)

(58) Field of Classification Search
CPC ......... C04B 33/04; C04B 33/22; C04B 33/24; C04B 35/18
See application file for complete search history.

(56) References Cited

U.S. PATENT DOCUMENTS 7,579,084 B2 *  8/2009  Saleh ..................... C04B 33/04
                                                    428/426
2008/0300129 A1   12/2008  Saleh

FOREIGN PATENT DOCUMENTS

AT           8345 U1    6/2006
EP         0726233 A2   8/1996
(Continued)

*Primary Examiner* — Karl E Group
(74) *Attorney, Agent, or Firm* — Volpe and Koenig, P.C.

(57) ABSTRACT

A composition for a refractory material comprising a base mixture having a composition in oxide (mol %) as follows: SiO2 between 69% and 73%; Al2O3 between 22% and 28%; TiO2 between 0.4% and 1%; Fe2O3 between 0.2% and 1%; CaO between 0.1% and 1%; MgO between 0.1% and 1%; K₂O between 0.5% and 2%; Na₂O between 0.1% and 0.5%; and comprising a filler mixture comprising at least one from between a schamotte and a smelting agent.

10 Claims, 4 Drawing Sheets

(51) Int. Cl.
*C04B 33/13* (2006.01)
*C04B 33/24* (2006.01)
*C04B 33/30* (2006.01)
*C04B 33/32* (2006.01)
*C04B 35/66* (2006.01)

(52) U.S. Cl.
CPC .. *C04B 2235/3272* (2013.01); *C04B 2235/77* (2013.01); *C04B 2235/9607* (2013.01); *C04B 2235/9615* (2013.01)

(56) References Cited

FOREIGN PATENT DOCUMENTS

| | | |
|---|---|---|
| JP | H10 194827 A | 7/1998 |
| WO | 2010022115 A2 | 2/2010 |

\* cited by examiner

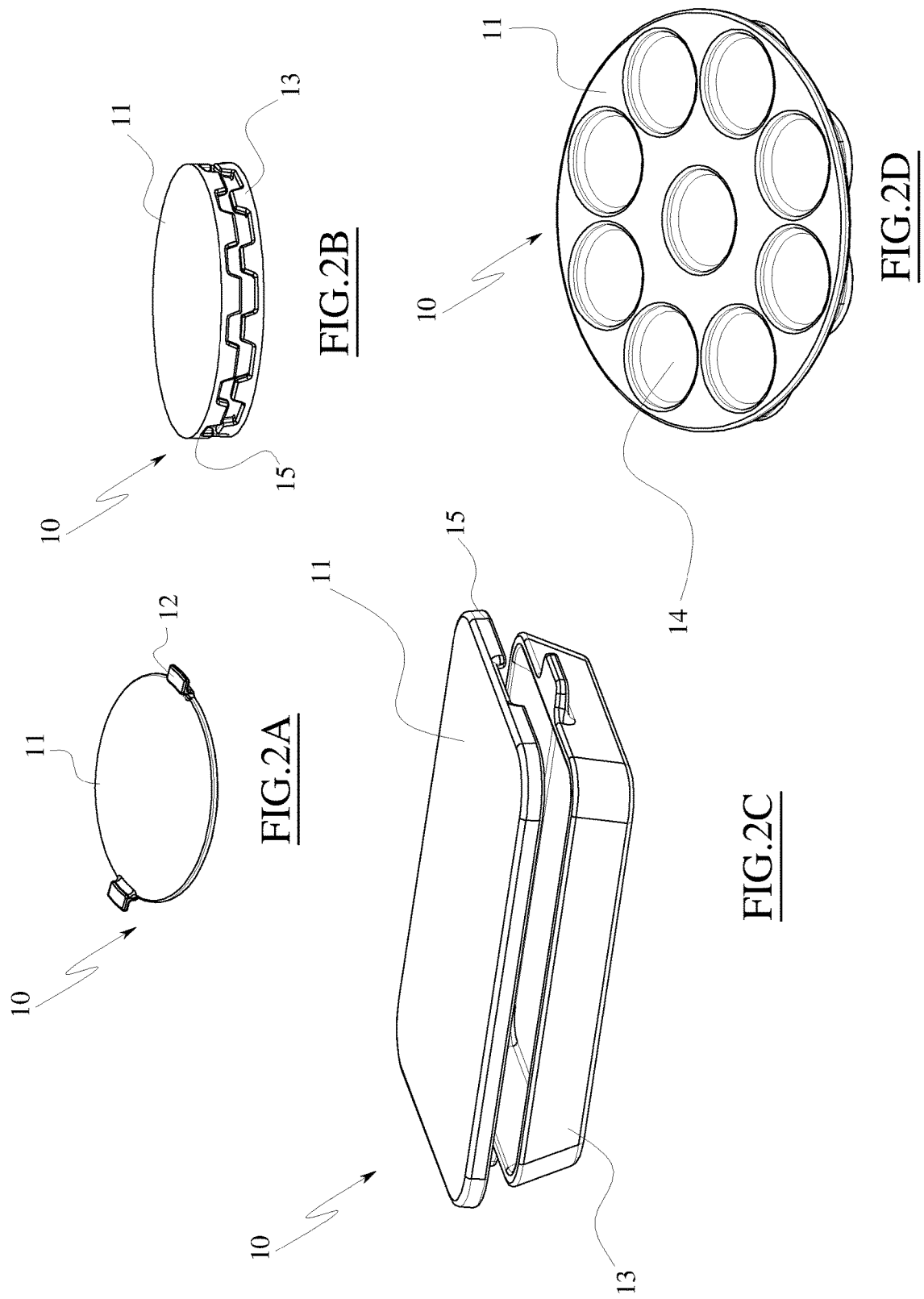

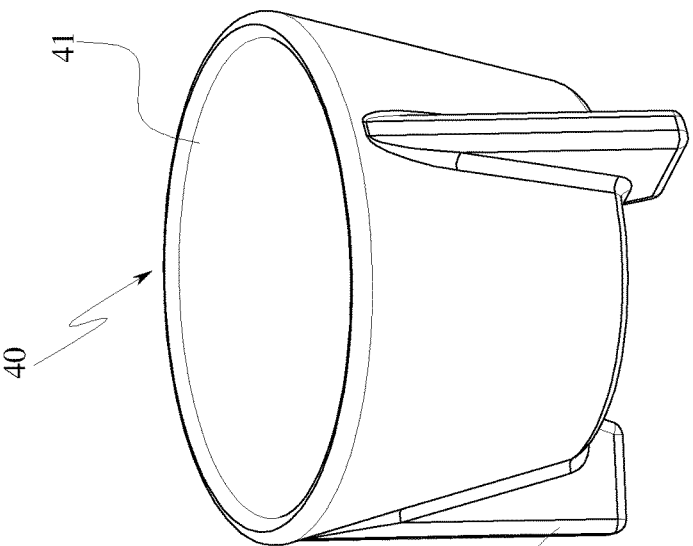
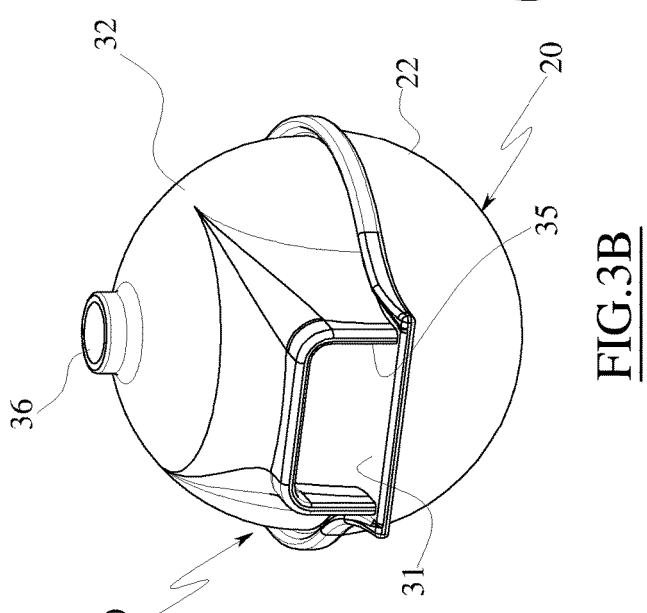
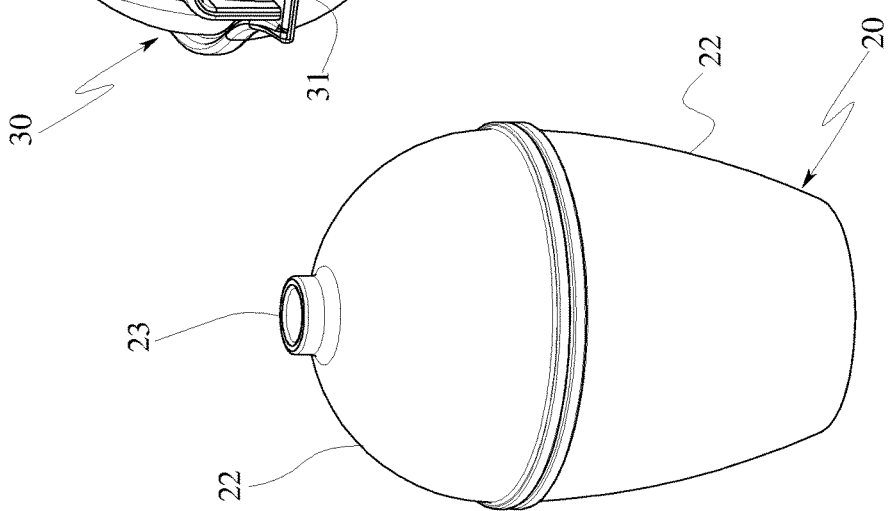
FIG.3A
FIG.3B
FIG.4

COMPOSITION FOR REFRACTORY MATERIAL

TECHNICAL FIELD

The present invention relates to a refractory material.

In particular the present invention relates to a refractory material for applications in contact with flames, such as for example barbecues and/or ovens, and/or for tableware applications destined also for contact with food or other applications.

PRIOR ART

As is known, various devices for heating environments and/or for cooking foods comprise fire chambers, i.e. environments, internal of the device, in which the combustion of a fuel takes place, for example wood, coal or gas.

For example, ovens or burners are widely used that exploit wood or gas for heating environments.

Further, barbecues or grills are widely available that use combustion, mainly of wood or charcoal, for cooking foods.

Fire chambers of known type are usually made of a metal material, such as for example cast iron or steel.

These devices, however, though characterised by low production costs, are subject to deformations and corrosion due to the temperatures and on contact with the flame that they reach during combustion, as well as poor weather.

Further, these types of devices do not enable reaching temperature conditions and ideal aesthetic and flavour conditions ideal for cooking foods.

To obviate these drawbacks, devices are known in which the cooking chamber is made of a refractory material.

These types of material are in fact characterised by a good heat accumulation capacity, i.e. the ability to accumulate the heat freed by the combustion and release it slowly so as to further increase the temperature internally of the cooking chamber, thus increasing the efficiency of the device after a certain time after being lit.

Further, the refractory materials, as is known, are characterised by good mechanical resistance to high temperatures.

However, the known refractory means, used for these purpose, are often characterised by a resistance to thermal shock that is not sufficient and which limits use thereof.

Further, refractory materials are usually characterised by a high absorption coefficient which prevents use thereof for direct contact with food, or in moist environments.

Document US 2008/300129 A1 discloses a ceramic composition for sanitary ware. In order to achieve a lower absorption coefficient the sanitary ware comprises an layer of an engobe and an outer layer of a glaze.

Document JP H10 194827 A discloses a composition for a refractory material for tableware which comprises Petalite ($Li_2O*Al_2O_3*8SiO_2$) and is characterized by a thermal expansion coefficient of $3*10^{-6}$ $C.^{-1}$.

Document WO 2010/022115 A2 discloses a refractory material comprising a mixture of a coarse platy day ad a fine hydrous day.

An aim of the present invention is to obviate the above-mentioned drawbacks of the prior art, with a solution that is simple, rational and relatively inexpensive. The aims are attained by the characteristics of the invention as reported in the independent claim. The dependent claims delineate preferred and/or particularly advantageous aspects of the invention.

DESCRIPTION OF THE INVENTION

In particular an embodiment of the invention makes available a composition for a refractory material comprising a base mixture having a composition in oxides (mol %) as follows: $SiO_2$ between 69% and 73%; $Al_2O_3$ between 22% and 28%; $TiO_2$ between 0.4% and 1%; $Fe_2O_3$ between 0.2% and 1%; CaO between 0.1% and 1%; MgO between 0.1% and 1%; $K_2O$ between 0.5% and 2%; $Na_2O$ between 0.1% and 0.5%; and comprising a filler mixture comprising at least one from between a schamotte and a smelting agent.

With this solution, a refractory material is made available that is characterised by a high resistance to thermal shock and a good ability to accumulate heat and, therefore, is particularly suitable for use in a fire chamber or as a catalyser.

Further, with this solution the material is characterised by a low absorption coefficient and therefore is particularly suitable for realising products able to enter into direct contact with foodstuffs or destined for applications in moist environments.

Further, in this way, a refractory material is made available obtained with raw materials of natural origin, completely recyclable and therefore substantially biocompatible.

The base mixture advantageously and preferably has a composition as follows: $SiO_2$=71.4%; $Al_2O_3$=25.7%; $TiO_2$=0.6%; $Fe_2O_3$=0.5%; CaO=0.3%; MgO=0.2%; $K_2O$=1%; $Na_2O$=0.3%.

With this solution, the base mixture gives the refractory material the necessary plasticity for forming a product and at the same time guarantees a good resistance to thermal shock.

In a further aspect of the invention the composition is constituted by the base mixture and the smelting agent, wherein the smelting agent is a feldspar preferably having a composition as follows: $LiO_2$ between 2% and 6%; $SiO_2$ between 75% and 79%; $Al_2O_3$ between 15% and 19%; $TiO_2$ between 0.1% and 1%; $Fe_2O_3$ between 0.01% and 0.05%; CaO between 0.01% and 0.5%; MgO between 0.01% and 0.1%; $K_2O$ between 0.1% and 1%; $Na_2O$ between 0.1% and 1%.

With this solution, the smelting agent facilitates the formation of a glass phase which closes the open surface pores of the material and make it effectively impermeable; the refractory material can therefore be generally used for food purposes.

In a further aspect of the invention the composition comprises between 30% and 50% in weight of base mixture and between 50% and 70% in weight of smelting agent.

With this solution, the refractory material comprises a sufficient plastic component, given by the base material, for guaranteeing the forming of the material itself into a manufactured product, and a sufficient component of smelting agent to give a low coefficient of dilation and excellent surface characteristics.

In a further aspect of the invention the composition is constituted by the base mixture and a filler material comprising both the schamotte and a smelting agent, wherein the schamotte has a composition as follows: $SiO_2$ between 52% and 56%; $Al_2O_3$ between 39% and 43%; $TiO_2$ between 1% and 2%; $Fe_2O_3$ between 0.5% and 1.5%; CaO between 0.01% and 1%; MgO between 0.01% and 1%; $K_2O$ between 0.5% and 1.5%; and wherein the lithium feldspar has the following composition: $LiO_2$ between 2% and 6%; $SiO_2$ between 75% and 79%; $Al_2O_3$ between 15% and 19%; $TiO_2$ between 0.1% and 1%; $Fe_2O_3$ between 0.01% and 0.05%; CaO between 0.01% and 0.5%; MgO between 0.01% and 0.1%; $K_2O$ between 0.1% and 1%; $Na_2O$ between 0.1% and 1%. In this way, the refractory material is enriched by a component, such as schamotte, which gives the refractory material itself a particular rigidity at high temperatures, i.e. a low thermal dilation coefficient and a high resistance to thermal shock.

In a further aspect of the invention the composition comprises between 30% and 50% in weight of base mixture and between 50% and 70% in weight of schamotte and lithium feldspar.

In this way, the refractory material comprises a sufficient plastic component, given by the base material, for guaranteeing the forming of the material itself into a manufactured product, and a sufficient component of schamotte to guarantee resistance to high temperatures.

In a further aspect of the invention a method is made available for realising a refractory material having a composition according to the invention, comprising steps of: mixing the base mixture and the filler mixture, mixing the composition with water to obtain a slip; dropping the slip into a die; drying the slip in the die so as to obtain a raw product; subjecting the raw product to a firing heat treatment so as to sinter the refractory material.

In this way, the refractory material can be worked simply and economically for forming the refractory material.

Further, with the forming by dropping the refractory material can be used for forming products with a complex geometry.

In a further aspect of the invention the firing takes place at a maximum temperature comprised between 1120° C. and 1200° C. for a time comprised between 30 and 50 minutes, preferably having a heating curve comprised between 11 and 14 hours and a cooling curve comprised between 11 and 14 hours.

With this solution, the material can be sintered at relatively low temperatures while obtaining a compaction that is such as to guarantee high rigidity at high temperatures and excellent resistance to thermal shock.

In a further aspect of the invention the firing takes place at a maximum temperature comprised between 1100° C. and 1200° C. for a time comprised between 30 and 50 minutes, preferably having a heating curve comprised between 11 and 14 hours and a cooling curve comprised between 11 and 14 hours.

With this solution, the material can be sintered at relatively low temperatures while obtaining a compaction that is such as to guarantee high rigidity at high temperatures and excellent surface characteristics.

Further, the product is given, in the die, a shape of an element able to define at least an internal cladding portion of a fire chamber and/or able to enter into direct contact with a flame internally of the fire chamber.

In this way, the refractory material, because of the resistance thereof to high temperatures and to thermal shock, can be used in fire chambers without reaching breaking point.

Further, owing to the ability to accumulate heat the refractory material enables a slow release of heat even after the flame has been switched off.

In a further aspect of the invention, the product is given, in the die, a shape of an item of tableware.

In this way, the refractory material can be used, thanks to the excellent surface properties and in particular because of the low absorption coefficient and the high level of hygiene, for direct contact with foodstuffs.

Further, thanks to the resistance to thermal shock, and the ability to accumulate heat, the tableware products can be placed in proximity of heat sources and then be distanced even sharply, without being subject to breakage and enabling a slow release of the heat so as to maintain the foodstuffs at a warm temperature.

BRIEF DESCRIPTION OF THE DRAWINGS

Further characteristics and advantages of the invention will emerge from a reading of the following description, provided by way of non-limiting example with the aid of the figures illustrated in the appended tables of drawings.

FIG. 2A is an axonometric view of a product obtained with the refractory material according to a first embodiment.

FIG. 2B is an axonometric view of a product obtained with the refractory material according to a second embodiment.

FIG. 2C is an axonometric view of a product obtained with the refractory material according to a third embodiment.

FIG. 2D is an axonometric view of a product obtained with the refractory material according to a fourth embodiment.

FIG. 3A is an axonometric view of a product obtained with the refractory material according to a fifth embodiment.

FIG. 3B is an axonometric view of a product obtained with the refractory material according to a sixth embodiment.

FIG. 4 is an axonometric view of a product obtained with the refractory material according to a seventh embodiment.

BEST WAY OF CARRYING OUT THE INVENTION

Figure 1:
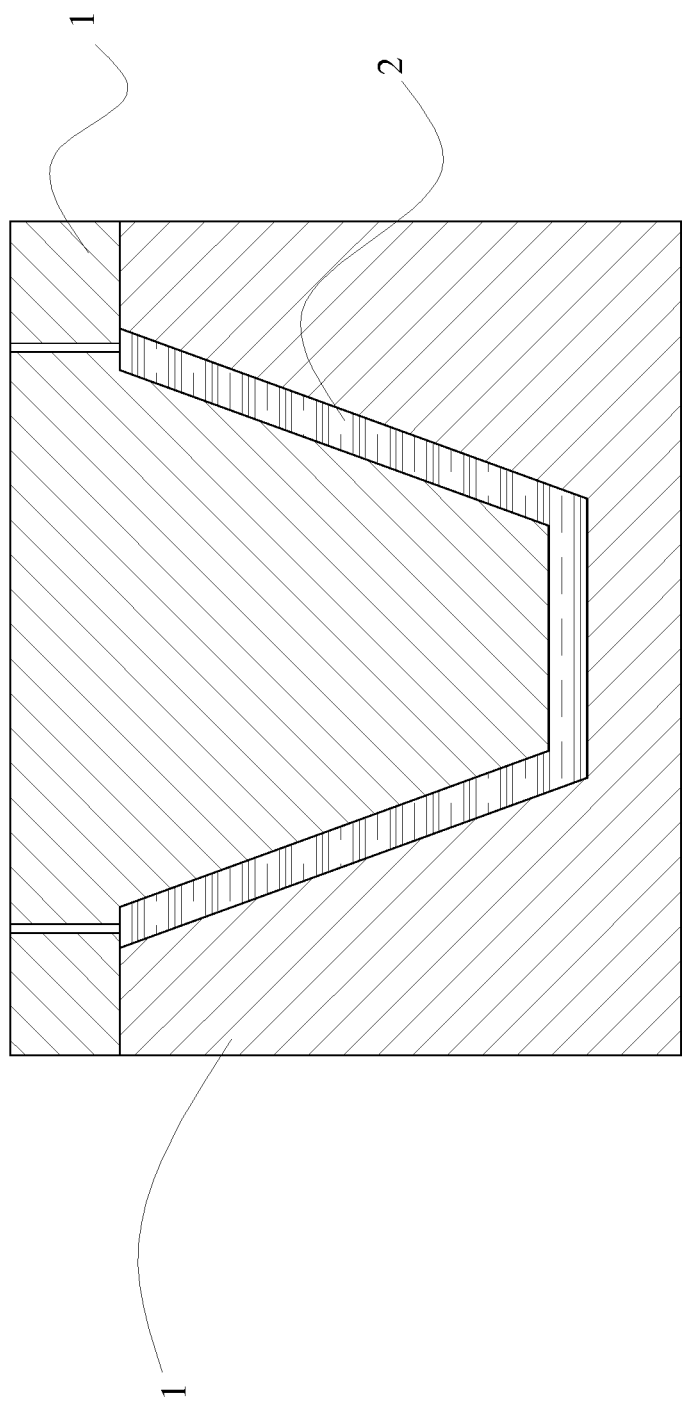
FIG. 1 is a section view of a manufactured product made of refractory material according to the invention in a die.

For the purposes of the present description, all the following compositions reported in the following, except where explicitly indicated, are understood to be expressed in molar percentages (mol %).

In accordance with the present invention, a refractory material is described for applications in a fire chamber and/or in contact with food comprising a base mixture having a base of a substantially clayey nature obtained by grinding and mixing one or more raw materials.

In particular, the base mixture is obtained by mixing a plurality of clays, for example of a kaolinite type.

The base mixture comprises the following composition in oxides: $SiO_2$ between 69% and 73%; $Al_2O_3$ between 22% and 28%; $TiO_2$ between 0.4% and 1%; $Fe_2O_3$ between 0.2% and 1%; CaO between 0.1% and 1%; MgO between 0.1% and 1%; $K_2O$ between 0.5% and 2%; $Na_2O$ between 0.1% and 0.5%. The base mixture preferably comprises the following composition: $SiO_2$=71.4%; $Al_2O_3$=25.7%; $TiO_2$=0.6%; $Fe_2O_3$=0.5%; CaO=0.3%; MgO=0.2%; $K_2O$=1%; $Na_2O$=0.3%.

The base mixture enables obtaining, following sintering, a refractory material characterised by low coefficients of heat expansion, and consequently good resistance to thermal shock, and by a good ability to accumulate heat.

Further, the clayey nature of the base mixture guarantees a sufficient plasticity for enabling the forming of products even having complex shapes by means of the refractory material.

The refractory material further comprises a filler mixture which comprises at least one from between a schamotte and a smelting agent.

The mixing of these components with the base mixture enables further reducing the coefficient of heat expansion so as to significantly improve resistance thereof to thermal shock and further enables reducing the porosity of the refractory material, considerably improving the absorption coefficient.

In greater detail, the refractory material comprises between 30% and 50% in weight of base mixture and between 50% and 70% in weight of at least one from between the schamotte and the smelting agent.

In a further preferred embodiment described herein, the refractory material comprises between 30% and 50% in weight of base mixture and, alternatively, between 50% and 70% in weight of the schamotte, or between 50% and 70% in weight of smelting agent.

In a further preferred embodiment described herein, the refractory material comprises between 30% and 50% in weight of base mixture and, alternatively, between 50% and 70% in weight of a filler comprising both schamotte and smelting agent.

In the following three embodiments of the refractory material are described, with some examples of products that can be made using the refractory material.

Refractory Material A

A first embodiment of the invention includes a refractory material A constituted by the base mixture and by a smelting agent.

For example, the refractory material A comprises between 30% and 50% in weight of base mixture and between 50% and 70% in weight of a smelting agent, for example a feldspar, preferably a lithium feldspar.

The refractory material A preferably comprises 50% in weight of base mixture and 50% in weight of lithium feldspar.

In the present embodiment, the lithium feldspar comprises the following composition in oxides: $LiO_2$ between 2% and 6%; $SiO_2$ between 75% and 79%; $Al_2O_3$ between 15% and 19%; $TiO_2$ between 0.1% and 1%; $Fe_2O_3$ between 0.01% and 0.05%; CaO between 0.01% and 0.5%; MgO between 0.01% and 0.1%; $K_2O$ between 0.1% and 1%; $Na_2O$ between 0.1% and 1%.

The lithium feldspar preferably comprises the following composition in oxides: $LiO_2=4.2\%$; $SiO_2=76.8\%$; $Al_2O_3=16.7\%$; $TiO_2=0.5\%$; $Fe_2O_3=0.03\%$; $CaO=0.25\%$; $MgO=0.05\%$; $K_2O=0.4\%$; $Na_2O=0.5\%$.

Lithium feldspar is mixed to the base mixture so as to obtain a refractory mixture.

The mixture between the base mixture and the lithium feldspar is done in a moist mixture so as to obtain a homogeneous refractory mixture.

In particular, the mixture takes place in moist conditions with an addition of water so as to obtain a slip comprising between 65% and 75% in weight of refractory mixture and 25% and 35% in weight of water, and having a density comprised between 1.78 and 1.80 kg/l.

The slip preferably comprises 71% in weight of refractory mixture and 29% in weight of water.

The slip can further comprise additives such as for example flocculants or deflocculants, so as to control the rheological characteristics of the slip.

The slip is then dropped into the die 1 (FIG. 1), the cavity of which substantially has the shape of the product 2 that is to be obtained, for example the shape of the tableware product 2 that will be described in the following.

The slip contained in the die 1 is dried so as to remove the water and enable the refractory material mixture to take on the shape of the cavity of the die 1 due to the plastic properties of the base mixture, defining the raw product 2.

In particular, the slip is dried so as to conserve a moisture comprised between 5% and 7% in weight.

The raw product 2, once formed in the die, is subjected to a firing heat treatment which brings it to the sintered condition.

The heat treatment has a maximum temperature T comprised between 1120° C. and 1200° C. which is maintained for a time τ comprised between 40 and 60 minutes.

The raw material 2 is preferably fired at a maximum temperature T of 1150° C. for a time τ comprised between 40 and 60 minutes.

In particular, the heat treatment exhibits a heating curve for reaching the maximum temperature T starting from ambient temperature which lasts for a time $\tau_{risc}$ comprised between 11 and 14 hours, for example 12 hours.

Further, the heat treatment exhibits a cooling curve for reaching ambient temperature starting from the maximum temperature T, which lasts for a time $\tau_{raff}$ comprised between 11 and 14 hours, for example 12 hours.

The refractory material A of this first embodiment comprises the following composition: $SiO_2$ between 68% and 73%; $Al_2O_3$ between 23% and 27%; $TiO_2$ between 0.1% and 1%; $Fe_2O_3$ between 0.1% and 1%; CaO between 0.1% and 0.5%; MgO between 0.1% and 0.5%; $K_2O$ between 0.5% and 1.5%; $Na_2O$ between 0.1% and 0.5%; $Li_2O$ between 1.5% and 3%.

The refractory material A of this first embodiment preferably comprises the following composition: $SiO_2=69.9\%$; $Al_2O_3=25.2\%$; $TiO_2=0.6\%$; $Fe_2O_3=0.5\%$; $CaO=0.3\%$; $MgO=0.2\%$; $K_2O=1\%$; $Na_2O=0.3\%$; $Li_2O=2.1\%$.

The refractory material A has a thermal dilation coefficient comprised between $1.7 \times 10^{-6}$ e $2 \times 10^{-6}$ °$C.^{-1}$, preferably $1.8 \times 10\text{-}6°C.^{-1}$ and an absorption coefficient comprised between 6 and 10%, for example 8%.

The refractory material A is characterised by a high resistance to thermal shock and a good mechanical resistance, and a significant ability to accumulate heat. Further, the addition of the lithium feldspar facilitates the sintering of the refractory material A even at relatively low temperatures so as to reduce to a minimum the open pores and improve the surface properties of the refractory material A itself such as for example the absorption coefficient.

Further, the refractory material A thus-produced is white and pleasant to view and especially suitable for realisation of tableware products, even without the need for application of a glaze on the surface of the product.

In particular, the low absorption coefficient is connected to other characteristics of the refractory material A such as, for example, the degree of dirtying.

In fact, a low absorption coefficient is equivalent to a poor ability to absorb substances such as for example water, oil or fats, and consequently the material is easily cleanable and in general particularly hygienic.

A material obtained in this way, being characterised by a high resistance to thermal shock and low absorption, is further usable for applications in moist environments such as for example saunas or aggressive environments such as for example catalysers.

With the low absorption coefficient, and the high hygienic properties, the refractory material A is particularly suitable for realisation of products 10 able to enter into direct contact with foodstuffs, for example tableware products.

Further, owing to the low thermal dilation coefficient and the good mechanical resistance, as well as the resistance to thermal shock, the refractory material A is suitable for products 10 subject to heat leaps such as, for example, cooking dishes, baking dishes or other products.

In the following some examples of products 10 are listed, realised using the refractory material A.

FIG. 2A illustrates a tray 10 comprising a flat body 11 to which handles 12 can be associated to enable gripping and manipulation of the tray 10 by a user. The tray 10, and in particular the flat body 11, is advantageously realised using refractory material A.

In this way, the tray 10 can be positioned in proximity of a heat source, for example the cinders of a barbecue or an oven, and support foods, for example a pizza, so as to enable it to cook, and, thanks to the resistance to thermal shock of the refractory material A, it can be even sharply removed from the heat source, thus being subjected to a heat leap without this leading to breakage of the tray 10.

Further, with the ability to accumulate heat of the refractory material A, the tray 10 slowly releases the accumulated heat in proximity of the heat source so as to maintain the cooked food warm even a long time after it has been cooked.

Figures from 2B to 2D illustrates further embodiments of the tray 10.

For example, the tray 10 shown in FIG. 2B comprises a container body 13, able to be associated inferiorly to the flat body 11, which, in turn, defines a cover of the container body 13.

The container body 13 is able to contain a heat source, such as for example cinders or radiating bodies 80 (FIG. 8) so as to maintain a high temperature of the flat body 11, which can be used for cooking or heating meals.

Alternatively (FIG. 2C) the container body 13, for example tub-conformed (such as a baking dish) can be heated, together with the flat body 11, in proximity of the heat source and can internally contain the cooked foods so as to function as a food-warmer.

Further, in this embodiment the flat body 11 can comprise a perimeter edge 15 which develops inferiorly of the flat body 11 and is able to associate to the edge of the opening of the container body 13 so as to isolate the tray 10.

FIG. 2D illustrates a further embodiment of the tray 10, in which the flat body 11 comprises a plurality of recesses 14 able to contain foods to be cooked or heated.

Refractory Material B

A second embodiment of the invention includes a refractory material B constituted by the base mixture and by a filler comprising both smelting agent and schamotte.

For example, the refractory material B comprises between 30% and 50% in weight of base mixture, as described herein above, and between 50% and 70% in weight of a filler material comprising both a smelting agent and schamotte.

The refractory material B preferably comprises 30% in weight of base mixture and 70% in weight of filler.

In greater detail, the refractory material comprises 30% in weight of base mixture and between 20% and 40% of smelting agent and 50% of schamotte, for example 30% of smelting agent and 40% of schamotte.

Further, and advantageously, in this embodiment the smelting agent is lithium feldspar as described above, so that the refractory material B is alike to the refractory material A to which is added a weight percentage variable between 30% and 50%, for example 40% of schamotte.

In the second embodiment, the schamotte comprises the following composition: $SiO_2$ between 52% and 56%; $Al_2O_3$ between 39% and 43%; $TiO_2$ between 1% and 2%; $Fe_2O_3$ between 0.5% and 1.5%; CaO between 0.01% and 1%; MgO between 0.01% and 1%; $K_2O$ between 0.5% and 1.5%.

The schamotte preferably comprises the following composition: $SiO_2$=54.8%; $Al_2O_3$=41.6%; $TiO_2$=1.6%; $Fe_2O_3$=1%; CaO=0.1%; MgO=0.2%; $K_2O$=0.7%.

The schamotte is ground so as to obtain a grain dimension comprised between 0.001 mm and 0.5 mm, and is then mixed to the base mixture and to the smelting agent so as to obtain a refractory mixture.

The mixture between the base mixture and the filler is advantageously done in a moist mixture so as to obtain a homogeneous refractory mixture.

In particular, the mixture takes place in moist conditions with an addition of water so as to obtain a slip comprising between 80% and 90% in weight of refractory mixture and 10% and 20% in weight of water, and having a density comprised between 1.99 and 2.00 kg/l.

The slip preferably comprises 84% in weight of refractory mixture and 16% in weight of water.

The slip can further comprise additives such as for example flocculants or deflocculents, so as to control the rheological characteristics of the slip.

The slip is then dropped into the die 1 (FIG. 1), the cavity of which substantially has the shape of the product 2 that is to be obtained, for example a product able to define at least a cladding of a fire chamber and/or to enter into direct contact with the flame, as will be more fully described in the following.

The slip contained in the die 1 is dried so as to remove the water and enable the refractory material to take on the shape of the cavity of the die 1 due to the plastic properties of the base mixture, defining the raw product 2.

In particular, the slip is dried so as to conserve a moisture comprised between 5% and 7% in weight.

The raw product 2, once formed in the die, is subjected to a firing heat treatment which brings it to the sintered condition.

The heat treatment has a maximum temperature T comprised between 1100° C. and 1200° C. which is maintained for a time $\tau$ comprised between 40 and 60 minutes.

The raw material 2 is preferably fired at a maximum temperature T of 1180° C. for a time $\tau$ comprised between 40 and 60 minutes.

In particular, the heat treatment exhibits a heating curve for reaching the maximum temperature T starting from ambient temperature which lasts for a time $\tau_{risc}$ comprised between 11 and 14 hours, for example 12 hours. Further, the heat treatment exhibits a cooling curve for reaching ambient temperature starting from the maximum temperature T, which lasts for a time $\tau_{raff}$ comprised between 11 and 14 hours, for example 12 hours.

The refractory material B of this embodiment comprises the following composition: $SiO_2$ between 60% and 65%; $Al_2O_3$ between 30% and 35%; $TiO_2$ between 0.8% and 1.2%; $Fe_2O_3$ between 0.5% and 1.1%; CaO between 0.1% and 0.3%; MgO between 0.1% and 0.3%; $K_2O$ between 0.5% and 1.5%; $Na_2O$ between 0.01% and 0.5%; $LiO_2$ between 0.5% and 1.5%.

The refractory material B of this embodiment preferably comprises the following composition: $SiO_2$=63.9%; $Al_2O_3$=31.8%; $TiO_2$=1%; $Fe_2O_3$=0.70%; CaO=0.20%; MgO=0.20%; $K_2O$=0.90%; $Na_2O$=0.20%; $LiO_2$=1.3%.

The refractory material B has a thermal dilation coefficient comprised between $2.6 \times 10^{-6}$ and $2.9 \times 10^{-6}$ C.$^{-1}$, preferably $2.7 \times 10^{-6}$ C.$^{-1}$.

Further, the refractory material B has a coefficient of water absorbance comprised between 9% and 12%.

The refractory material B can, further, be glazed so as to occlude the open pores of the products, improving their surface characteristics, such as for example surface hardness, the capacity to reflect heat and resist dirt, as well as being able to be decorated as desired.

The refractory material B is characterised by a high resistance to thermal shock and a good mechanical resistance, and a significant ability to accumulate heat which, for example, is particularly suitable for applications internally of fire chambers.

In fact, owing to the ability to accumulate heat the product 2 realised using the refractory material B, used internally of fire chambers, enables a slow release of heat even after the flame has been switched off.

Further, owing to the low thermal dilation coefficient and the good mechanical resistance, as well as the resistance to thermal shock, the refractory material B is suitable for products that constitute components, including structural components, of the fire chambers themselves.

In particular, the refractory material B can be used for realising refractory products 2 able to define at least a portion of an internal cladding of a fire chamber and/or able to enter into direct contact with a flame internally of the fire chamber.

In the following some examples of products 2 are listed, realised using the refractory material B.

FIG. 3A illustrates a barbecue 20, for example having a substantially ovoid shape provided with a first lower concave body 21, for example having a substantially truncoconical or hemispheric shape, and able to delimit a fire chamber internally of the concavity.

The first concave body 21 can rest on the ground on rest feet of known type and not shown in the figures.

The barbecue 20 further comprises a second upper concave body 22, for example shaped as a hemispherical cap able to close the concavity of the first concave body 21 defining a cover of the barbecue 20.

The second concave body 22 comprises an upper opening 23 enabling exit of the combustion fumes which are generated internally of the barbecue 20.

Advantageously, the first and the second concave bodies 21,22 are made using the refractory material B.

In particular, the walls internal of the concavity of the concave bodies 21 and 22 are at least partly clad using the refractory material B.

FIG. 3B illustrates an oven 30 provided with a flat base 31 surmounted by a vault 32 so as to define a cooking chamber internally of the oven 30.

The oven 30 further comprises a front opening 35 which enables insertion of the foods internally of the cooking chamber, and can comprise an upper opening 36 for exit of the hot fumes.

In a preferred embodiment, the oven 30 is able to be used in combination with a barbecue 20, for example made of a refractory material shown in FIG. 3A. In particular, in this embodiment, the oven 30 can be used in replacement for the second concave body 22 and can be associated to the upper opening of the first concave body 21 of the barbecue 20.

In greater detail, the base 31 is able to occlude the opening of the first concave body 21 and enables, through appropriate holes, not illustrated (for example made at the flat base 31, preferably in a perimeter zone thereof), the passage of the fumes and heat from the fire chamber (internal of the first concave body 21) to the cooking chamber (internal of the oven 30).

The oven 30 is advantageously entirely made using the refractory material B; in this way the vault 32 and the base 31 enable, thanks to the capacity for heat accumulation, to reach the suitable temperatures for cooking the foods, for example bread or pizza.

FIG. 4 illustrates a brazier 40 provided with a tub body 41 that is superiorly open.

The brazier 40 further comprises rest feet 42 associated to the concave body 41 for improving the stability of the brazier 40 on a rest surface, for example on the ground.

The brazier 40 and in particular at least the concave body 41, is advantageously realised using the refractory material B, and can be used for combustion of wood or coal, for example for realising a bonfire in a garden or another open environment.

Figure 5:
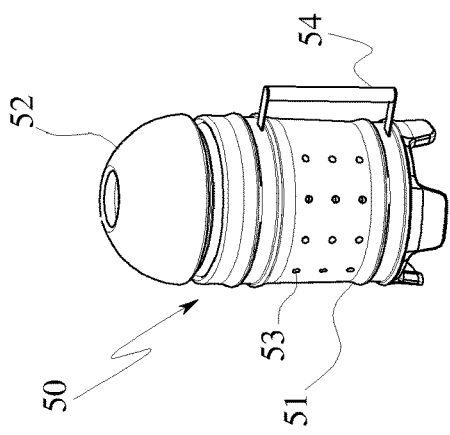
FIG. 5 is an axonometric view of a product obtained with the refractory material according to an eighth embodiment.

FIG. 5 illustrates an igniter 50, provided with a body shaped as a beaker 51 and a cover 52, for example cap-shaped and provided with an upper opening. The beaker body 51 comprises a lateral wall provided with a plurality of holes 53 which enable aeration of the internal cavity of the beaker body 51.

In practice, the beaker body 51 can accommodate cinders to facilitate combustion thereof before locating them internally of the fire chamber, for example of a barbecue.

The igniter 50 further comprises a handle 54 fixed to the beaker body 51 so as to enable an operator to move the igniter 50 itself.

The igniter 50, and in particular the beaker body 51 and the cover 52, is realised using refractory material B.

Figure 6:
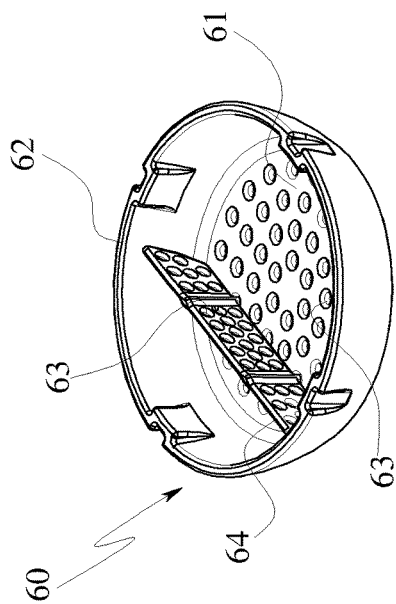
FIG. 6 is an axonometric view of a product obtained with the refractory material according to a ninth embodiment.

FIG. 6 illustrates a cinder-bearing device 60 able to definer the bottom of the fire chamber of a barbecue, not illustrated.

In particular, the cinder-bearing device 60 can be inserted in a barbecue, for example made of a metal or another material such as what is described in the foregoing, so as to define the bottom of the fire chamber in which the cinders are placed.

The cinder-bearing device 60 comprises a base 61 that is substantially flat, and comprises a lateral edge 62, salient from the base 61, able to adhere to the walls of the barbecue.

The base 61 comprises a plurality of through-holes 63 which facilitate the oxygenation of the cinders contained in the device 60.

The cinder-bearing device 60 can further comprise one or more vertical walls 64, for separating the internal volume of the base 61, also provided with through-holes 63.

In particular, the vertical walls 64 are housed internally of the cinder-bearing device 60 associated, for example removably, to the lateral edge 62.

The vertical walls 64 are for subdividing the cavity of the cinder-bearing device 60 into a plurality of compartments for receiving the cinders.

For example, by inserting one or more vertical walls in a cinder-bearing device 60 housed in a barbecue, it is possible to create compartments for the cinders and compartments which will remain empty and free of cinders above which the foods to be cooked will be arranged so as to remain distanced from the heat source and so that the fat, or the substances released by the foodstuffs during cooking, can be collected in special trays located in the compartments that are free of cinders.

The cinder-bearing device 60 is advantageously made entirely of the refractory material B.

Figure 7:
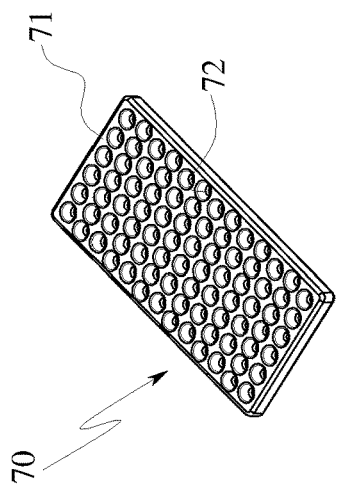
FIG. 7 is an axonometric view of a product obtained with the refractory material according to a tenth embodiment.

FIG. 7 illustrates a heat-diffuser plate 70 able to be arranged in proximity of a burner in a gas barbecue.

The heat-diffuser plate 70 comprises a plurality of through-holes 71 for facilitating transmission of the heat and the air flow towards the burner.

In practice, the heat-diffuser plate 70 can be arranged between the burner of a gas barbecue and the support grill of the foods being cooked and prevents the fat released from the foodstuffs, by falling on the burner, from generating a potentially dangerous flame for the operator.

The heat-diffuser plate 70 is advantageously realised entirely of a refractory material B able to resist, thanks to the property of the refractory material, the differences of temperature which are generated between the opposite faces of the plate 70 itself.

Figure 8:
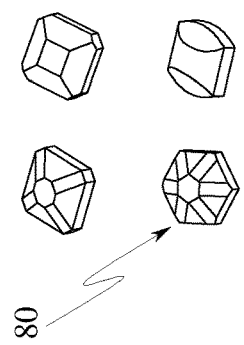
FIG. 8 is an axonometric view of a product obtained with the refractory material according to an eleventh embodiment.

FIG. 8 illustrates a radiating body 80, realised entirely of refractory material B, which can have any shape and geometry as shown in the figure.

For example, the radiating body 80 can have a polyhedral shape having a quadrangular, hexagonal or irregular base, for example with bevelled or rounded edges, so as to maximise the surface of the radiating body.

The radiating body 80 can be arranged in contact with the flame, for example mixed with the cinders, in a fire chamber, for example in an oven or a barbecue, so as to exploit the heat accumulating capacity of the refractory material B and so as to facilitate a slow release of the heat including following the switching-off of the flame.

The radiating bodies 80 can be used also, for example, in braziers for saunas or Turkish baths so that they can be directly sprayed with water for generation of heat.

The refractory material B might, alternatively, comprise, further to the base mixture, a filler comprising only schamotte, without the addition of the smelting agent without for this reason forsaking the scope of the present invention.

The invention as it is conceived is susceptible to numerous modifications, all falling within the scope of the inventive concept.

Further, all the details can be replaced with other technically-equivalent elements.

In practice the contingent forms and dimensions can be any according to requirements without thus forsaking the scope of protection of the following claims.

The invention claimed is:

1. A composition for a refractory material comprising a base mixture having a composition as follows (mol %):
   $SiO_2$ between 69% and 73%;
   $Al_2O_3$ between 22% and 28%;
   $TiO_2$ between 0.4% and 1%;
   $Fe_2O_3$ between 0.2% and 1%;
   CaO between 0.1% and 1%;
   MgO between 0.1% and 1%;
   $K_2O$ between 0.5% and 2%; and
   $Na_2O$ between 0.1% and 0.5%;
   and comprising a filler mixture which comprises at least one of: a schamotte or a smelting agent.

2. The composition of claim 1, wherein the base mixture has a composition as follows in oxides (mol %):
   $SiO_2$=71.4%;
   $Al_2O_3$=25.7%;
   $TiO_2$=0.6%;
   $Fe_2O_3$=0.5%;
   CaO=0.3%;
   MgO=0.2%;
   $K_2O$=1%; and
   $Na_2O$=0.3%.

3. The composition of claim 1, wherein the filler mixture is the smelting agent, and wherein the smelting agent is a feldspar having a composition as follows (mol %):
   $LiO_2$ between 2% and 6%;
   $SiO_2$ between 75% and 79%;
   $Al_2O_3$ between 15% and 19%;
   $TiO_2$ between 0.1% and 1%;
   $Fe_2O_3$ between 0.01% and 0.05%;
   CaO between 0.01% and 0.5%;
   MgO between 0.01% and 0.1%;
   $K_2O$ between 0.1% and 1%; and
   $Na_2O$ between 0.1% and 1%.

4. The composition of claim 3, wherein the composition comprises between 30% and 50% in weight of base mixture and between 50% and 70% in weight of smelting agent.

5. The composition of claim 1, wherein the filler mixture comprises both the schamotte and the smelting agent, and wherein the schamotte comprises a composition as follows (mol %):
   $SiO_2$ between 52% and 56%;
   $Al_2O_3$ between 39% and 43%;
   $TiO_2$ between 1% and 2%;
   $Fe_2O_3$ between 0.5% and 0.5%;
   CaO between 0.01% and 1%;
   MgO between 0.01% and 1%; and
   $K_2O$ between 0.5% and 1.5%;
   and wherein the smelting agent is a lithium feldspar having a composition as follows (mol %):
   $LiO_2$ between 2% and 6%;
   $SiO_2$ between 75% and 79%;
   $Al_2O_3$ between 15% and 19%;
   $TiO_2$ between 0.1% and 1%;
   $Fe_2O_3$ between 0.01% and 0.05%;
   CaO between 0.01% and 0.5%;
   MgO between 0.01% and 0.03%;
   $K_2O$ between 0.1% and 1%; and
   $Na_2O$ between 0.1% and 1%.

6. The composition of claim 5, wherein the composition comprises between 30% and 50% in weight of base mixture and between 50% and 70% in weight of schamotte and feldspar.

7. A method for preparing a refractory material having a composition as in claim 1, comprising steps of:
   mixing the base mixture to the smelting agent;
   mixing the composition with water to obtain a slip;
   dropping the slip into a die (1);
   drying the slip in the die (1) so as to obtain a raw product (2); and
   subjecting the raw product (2) to a heat treatment so as to sinter the refractory material.

8. The method of claim 7, wherein the firing takes place at a maximum temperature between 1100 and 1200° C. for a time comprised between 30 and 50 minutes, having a heating curve between 11 and 14 hours and a cooling curve between 11 and 14 hours.

9. The method of claim 7, wherein the die has a shape of an item of tableware.

10. The method of claim 7, wherein the die has a shape of an element, which is at least one of: able to define at least an internal cladding portion of a fire chamber or able to enter into direct contact with a flame internally of the fire chamber.

* * * * *